(12) United States Patent
Nagasaki

(10) Patent No.: US 9,609,157 B2
(45) Date of Patent: *Mar. 28, 2017

(54) IMAGE FORMING APPARATUS HAVING A PROJECTION TO REGULATE AN ATTITUDE BETWEEN TWO CASINGS WHEN A LOAD IS APPLIED

(71) Applicant: CANON KABUSHIKI KAISHA, Tokyo (JP)

(72) Inventor: Tsuyoshi Nagasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,352

(22) Filed: Jan. 15, 2016

(65) Prior Publication Data
US 2016/0212284 A1 Jul. 21, 2016

(30) Foreign Application Priority Data
Jan. 19, 2015 (JP) .................................. 2015-007944

(51) Int. Cl.
*H04N 1/00* (2006.01)
*G03G 21/16* (2006.01)
(Continued)

(52) U.S. Cl.
CPC ..... *H04N 1/00559* (2013.01); *G03G 21/1619* (2013.01); *H04N 1/00546* (2013.01);
(Continued)

(58) Field of Classification Search
CPC .. H04N 1/00559; H04N 1/00546; H04N 1/06; H04N 1/10; H04N 2201/0094; G03G 21/1604; G03G 21/1619
(Continued)

(56) References Cited

U.S. PATENT DOCUMENTS 7,418,219 B2 * 8/2008 Woo ..................... G03G 15/605
399/107
8,099,017 B2 * 1/2012 Takemoto .............. G03G 15/60
399/107
(Continued)

FOREIGN PATENT DOCUMENTS

JP 2006201554 A * 8/2006
JP 2007-293216 A 11/2007

*Primary Examiner* — David Gray
*Assistant Examiner* — Laura Roth
(74) *Attorney, Agent, or Firm* — Fitzpatrick, Cella, Harper & Scinto

(57) ABSTRACT

An image forming apparatus includes an image reading portion; an image forming portion; a first casing; a second casing including a space which continuously opens to two directions perpendicular to not only the vertical direction but also each other and including a mounting portion where the first casing is mountable at a position where the space does not continuously open to the two directions; one or more supporting portion; and one or more auxiliary supporting portion. A gap is formed between itself and the other one of the first casing and the mounting portion in a state in which no load is externally exerted on the first casing, and wherein the auxiliary supporting portion contacts the other one when a load not less than a predetermined load is externally exerted on an upper portion of the first casing downward at a position deviated from the mounting portion.

8 Claims, 6 Drawing Sheets

(51) Int. Cl.
 *H04N 1/10* (2006.01)
 *H04N 1/06* (2006.01)
(52) U.S. Cl.
 CPC ............... *H04N 1/06* (2013.01); *H04N 1/10* (2013.01); *G03G 21/1604* (2013.01); *H04N 2201/0094* (2013.01)
(58) Field of Classification Search
 USPC ........................................................ 399/107
 See application file for complete search history.

(56) References Cited

U.S. PATENT DOCUMENTS

2002/0015604 A1* 2/2002 Watanabe .......... G03G 15/6552
 399/405
2012/0320396 A1* 12/2012 Kurahashi .......... H04N 1/00549
 358/1.13

* cited by examiner

IMAGE FORMING APPARATUS HAVING A PROJECTION TO REGULATE AN ATTITUDE BETWEEN TWO CASINGS WHEN A LOAD IS APPLIED

FIELD OF THE INVENTION AND RELATED ART

The present invention relates to an image forming apparatus such as a printer, a facsimile machine, a copying machine or a multi-function machine having a plurality of functions of these machines.

As an image forming apparatus including an image reading portion, a structure in which an image reading device including the image reading portion is provided on an image forming apparatus main assembly including an image forming portion has been conventionally known. In such a structure, a so called in body discharge constitution in which a discharge tray on which a recording material carrying thereon an image formed at the image forming portion is to be discharged is provided in a space between the image reading device and the image forming apparatus main assembly has also been known. In the case of the in body discharge constitution, in order that a user can easily take out the recording material discharged on the dispose tray, a space where the dispose tray is provided is configured so as to open to two directions toward a front surface and one of two side surfaces.

Such an image forming apparatus has a structure in which an image reading portion casing constituting the image reading device and supporting the image reading portion is provided on an image forming portion casing constituting the image forming apparatus and supporting the image forming portion. The structure further includes a first supporting member provided on one of sides of the image forming portion casing and disposed so as to be extended between a front side plate and a rear side plate and includes a second supporting member provided on the other side of the image forming portion casing and supported by the rear side plate, in a cantilever manner. The first supporting member and the second supporting member support the image reading portion casing in cooperation. In this way, the second supporting member is formed in the form of the cantilever, so that a space between the image reading portion casing and the image forming portion casing continuously opens to two directions (for example, Japanese Laid-Open Patent Application 2007-293216).

However, as described above, in the case where the space between the image reading portion casing and the image forming portion casing is constituted so as to continuously open to the two directions, when an load is exerted on the image reading device downward on an open side of the space, there is a possibility that the image reading portion casing causes distortion. Particularly, the user leans against a corner between a front surface side and a side surface side opposite from another side surface side where the second supporting member of the image reading device is disposed, and thus when a load is exerted on this corner downward, the image reading portion casing is liable to cause the distortion since the second supporting member is the cantilever. When the image reading portion casing causes the distortion, image reading accuracy of the image reading portion supported by the image reading portion casing lowers. In order to suppress the distortion, it would be considered that a thickness of the second supporting member is increased or a reinforcing plate is additionally provided, but in either case, a weight and a manufacturing cost are increased.

SUMMARY OF THE INVENTION

A principal object of the present invention is to provide an image forming apparatus capable of reducing a degree of distortion of an image reading portion casing.

According to an aspect of the present invention, there is provided an image forming apparatus comprising: an image reading portion for reading an image; an image forming portion for forming the image; a first casing for supporting the image reading portion; a second casing for supporting the image forming portion, wherein the second casing is provided below the first casing with respect to a vertical direction and a space continuously opens to two directions perpendicular to not only the vertical direction but also each other, and wherein the second casing includes a mounting portion where the first casing is mountable at a position where the space does not continuously open to the two directions; one or more supporting portion, provided on at least one of the first casing and the mounting portion, for supporting the first casing relative to the second casing; and one or more auxiliary supporting portion, provided on one of the first casing and the mounting portion, for supporting the first casing relative to the second casing, wherein a gap is formed between itself and the other one of the first casing and the mounting portion in a state in which no load is externally exerted on the first casing, and wherein the auxiliary supporting portion contacts the other one when a load not less than a predetermined load is externally exerted on an upper portion of the first casing downward at a position deviated from the mounting portion for the first casing.

Further features of the present invention will become apparent from the following description of exemplary embodiments with reference to the attached drawings.

DESCRIPTION OF THE EMBODIMENTS

Figure 1:
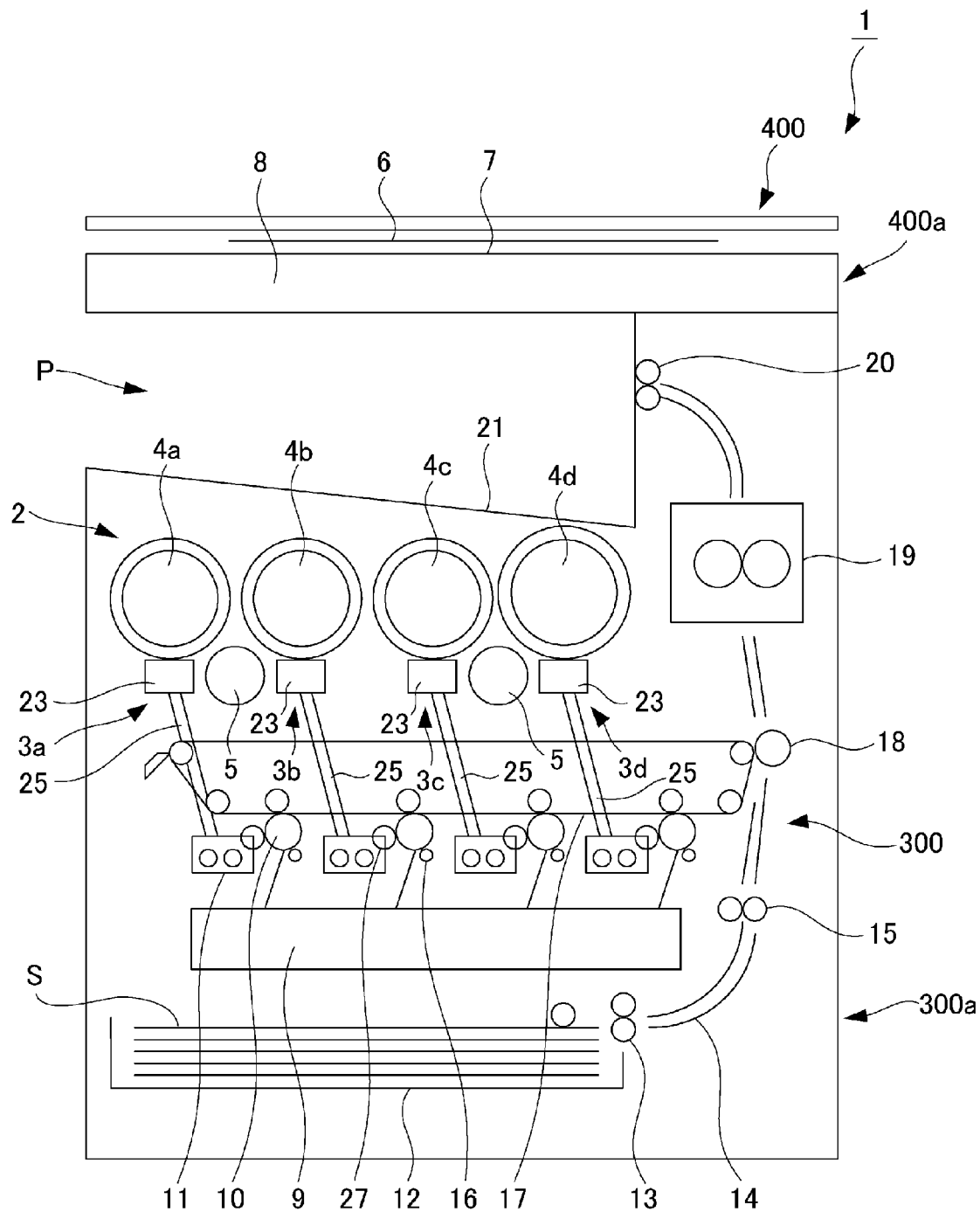
FIG. 1 is a schematic sectional view of an image forming apparatus according to an embodiment of the present invention.

Embodiments of the present invention will be described using FIGS. 1 to 6. First, using FIG. 1, a general structure of an image forming apparatus in an embodiment will be described. In the following description, "front" and "rear" views are those with respect to a front side and a rear side, respectively, of the image forming apparatus, and "left" and "right" views are those when the image forming apparatus is seen from the front side. The front side of the image forming apparatus is a side where a user operates the image forming apparatus, e.g., where an operation panel is provided or a side where the cassette for accommodating the recording material is to be pulled out. Further, an up-down direction is that in a state in which the image forming apparatus is placed on an installation surface such as a floor.

[Image Forming Apparatus]

An image forming apparatus 1 in this embodiment employs an electrophotographic type and a constitution in which an image reading device 400a including an image reading portion 400 is provided on an image forming apparatus main assembly 300a including an image forming portion 300. The image reading portion 400 reads an original 6, placed on an original supporting platen glass 7, by an image sensor 8 and obtains information from the original 6 as image information. The image forming portion 301 has a so-called tandem-type structure in which a plurality of photosensitive members (image bearing members or photosensitive drums) 10 are arranged in a travelling direction of an intermediary transfer belt (intermediary transfer member) 17.

Each of the photosensitive drums 10 is electrically charged by a charger 16, and then is subjected to scanning by a laser scanner 9 (exposure device) on the basis of the image information read by the image reading portion 400 or image information sent from an external terminal, so that an electrostatic latent image is formed no a surface thereof. The electrostatic latent image is developed as a toner image with a toner supplied from a developing device 11. In the developing devices 11, toners of colors of yellow, magenta, cyan and black, respectively, are accommodated. On the photosensitive drums 10, toner images of the colors of yellow, magenta, cyan and black, respectively, are formed.

The color toner images formed on the respective photosensitive drums 10 are superposedly transferred onto the intermediary transfer belt 17, so that a superposed for color toner images are formed on the intermediary transfer belt 17.

The toner images formed on the intermediary transfer belt 17 are transferred, at a nip with a transfer roller 18, onto a recording material (e.g., a sheet material such as a sheet or an OPC sheet) S fed from a cassette 12. Specifically, sheets of the recording material S fed one by one by a feeding and separating device 13 are fed to a registration roller pair 15 via a feeding portion 14. By the registration roller pair 15, the recording material S is fed in synchronism with rotation of the photosensitive drums 10 and scanning timing of the laser scanner 9.

The recording material S is fed to a fixing device 19 in a state in which the image is formed thereof, and then is heated and pressed by the fixing device 19, so that the image is fixed on the recording material S. Thereafter, the recording material S on which the image is fixed is discharged on a (paper) discharge tray 21 through a (paper) discharging portion 20. The dispose tray 21 is provided in a space P between the image reading device 400a and the image forming apparatus main assembly 300a. The space P continuously opens to a front surface (side) and one of side surfaces (left-side surface in FIG. 1) of the image forming apparatus 1 in two directions. In other words, the space P is continuously covered at a rear surface (side) and the other side surface (right-side surface in FIG. 1), and each of the front surface, the left-side surface and a corner between the front surface and the left-side surface is open. As a result, the recording material discharged on the discharge tray 21 can be easily taken out by the user through the front surface (side) or the left-side surface (side).

When the toner in each of the developing devices 11 is consumed by forming the image as described above, a developer (toner) is supplied from associated one of the developer supply containers 4a-4d, for the respective colors, of a developer supplying portion 2 to associated one of the developing devices 11 for the respective colors. Specifically, in the case where a one-component developing device for carrying out development using the one-component magnetic toner is used, as the developer, the one-component magnetic toner is supplied. Further, in the case where a two-component developing device for carrying out development using a two-component developer containing a magnetic carrier and a non-magnetic toner in mixture is used, as the developer, the non-magnetic toner is supplied. Incidentally, in this case, a constitution in which as the developer, also the magnetic carrier is supplied together with the non-magnetic toner may be employed.

The developer supplying portion 2 includes the developer supply containers 4a-4d, a driving mechanism 5, and developer supplying devices 3a-3d for supplying the developer of the respective colors from the developer supply containers 4a-4d to the developing devices 11. The developer supplying devices 3a-3d includes hoppers 23, supply paths 25, and the like. The developer supply container 4a-4d are rotationally driven by the driving mechanism 5 when the developer is needed, so that the developers are supplied from the developer supply containers 4a-4d to the hoppers 23. The developers discharged from the developer supply containers 4a-4d and stored in the hoppers 23 are fed to the developing devices 11 through the supply paths 25.

The above-described constituent elements or units used from the formation of the electrostatic latent image to the formation of the image on the recording material are supported by an image forming portion casing 100. That is, the image forming portion 300 is supported by the image forming portion casing 100. The above-described original supporting platen glass 7, the image sensor 8 and the like are supported by an image reading portion casing 800. That is, the image reading portion 400 is supported by the image reading portion casing 800.

[Structure]

A schematic constitution of a structure 500 for the image forming apparatus 1 including the image forming portion casing 100 supporting the image forming portion 300 and the image reading portion casing 800 supporting the image reading portion 400 will be described using FIG. 2. The image forming portion casing 100 is disposed under the image reading portion casing 800 and is connected with the image reading portion casing 800 in a state in which the image reading portion casing 800 is mounted thereon. In the following, respective constitutions will be described specifically.

[Image Forming Portion Casing]

The image forming portion casing 100 includes a front side plate 101, a rear side plate as a second side plate, a main base 103, a right post 104 and a left post 105, and the like. The image forming portion casing 100 further includes a first lower right stay 106 as a stay, a second lower right stay 113 as a second stay, a lower left stay 107, a lower front stay 108, an upper right stay 109, a middle left stay 110, a middle right stay 111, an oblique stay 112, a supporting cantilever 203, and the like.

The front side plate 101 and the rear side plate 102 are provided opposed and substantially in parallel to each other via the image forming portion 300 described above. The main base 103 not only connects the front side plate 101 and the rear side plate 102 but also on which the laser scanner 9 is mounted. The right post 104 is provided along the up-down direction and to which the front side plate 101 is fastened, and extends downwardly to the neighborhood of the installation surface while supporting a right end of the front side plate 101. The left post 105 is provided along the up-down direction and to which the front side plate 101 is fastened, and extends downwardly to the neighborhood of the installation surface while supporting a left end of the front side plate 101.

The first lower right stay 106 is provided along a direction substantially perpendicular to the front side plate 101 so as to connect the right post 104 and the rear side plate 102 in the neighborhood of the installation surface, and regulates positions of these members with respect to a depth direction (front-rear direction) in the neighborhood of the installation surface. The first lower right stay 106 is provided, at an inner central surface thereof with respect to a width (left-right direction), with a rail 106a for guiding a cassette 12 to the image forming apparatus main assembly 300a in an insertable and pullable-out manner. The width direction refers to a direction (left-right direction) which is perpendicular to the up-down direction and which is parallel to the front side plate 101.

The second lower right stay 113 is disposed between the front side plate 101 and the first lower right stay 106 with respect to the up-down direction and is disposed toward a center side more than the first lower right stay 106 with respect to the width direction parallel to the front side plate 101, and connects the right post 104 and the rear side plate 102. That is, the lower right stay 113 is disposed substantially perpendicular to the first lower right stay 106. Also at a widthwise inner surface of such a second lower right stay 113, a rail for guiding the cassette 12 to the image forming apparatus main assembly 300a in an insertable and pullable-out manner is provided.

In this embodiment, the cassette 12 includes a two-stage structure which is omitted from FIG. 1, and a feeding path of the recording material from a lower-stage cassette to an upper-stage cassette is largely detoured in view of a load during feeding of the recording material. For this reason, the upper-stage cassette is disposed at a position shifted leftward from the lower-stage cassette. Accordingly, the second lower right stay 113 for guiding the upper-stage cassette is disposed at a position shifted leftward relative to the first lower right stay 106 for guiding the lower-stage cassette.

The lower left stay 107 is disposed in the neighborhood of the installation surface so as to connect the left post 105 and the rear side plate 102 and regulates positions of these members with respect to the depth direction in the neighborhood of the installation surface. The lower left stay 107 is provided at a widthwise inner central surface thereof with a rail for guiding the cassette 12 to the image forming apparatus main assembly 300a in an insertable end pullable-out manner. The lower right stay 108 is disposed in the neighborhood of the installation surface so as to connect the right post 104 and the left post 105, and regulates positions of these posts with respect to the width direction in the neighborhood of the installation surface.

The upper right stay 109 is disposed so as to connect an upper end of the right post 104 and the rear side plate 102, and regulates positions of these members with respect to the depth direction at the upper end. The middle left stay 110 is disposed so as to connect an upper left end portion of the front side plate 101 and the rear side plate 102, and regulates these members at the positions with respect to the depth direction. The middle right stay 111 is disposed so as to connect an upper right peripheral portion of the front side plate 101 and the rear side plate 102, and regulates these members at the positions with respect to the depth direction. The oblique stay 112 is disposed so as to connect an upper left end portion of the front side plate 101 and a rear portion of the middle right stay 111, and suppresses distortion of the image forming portion casing 100.

Figure 3:
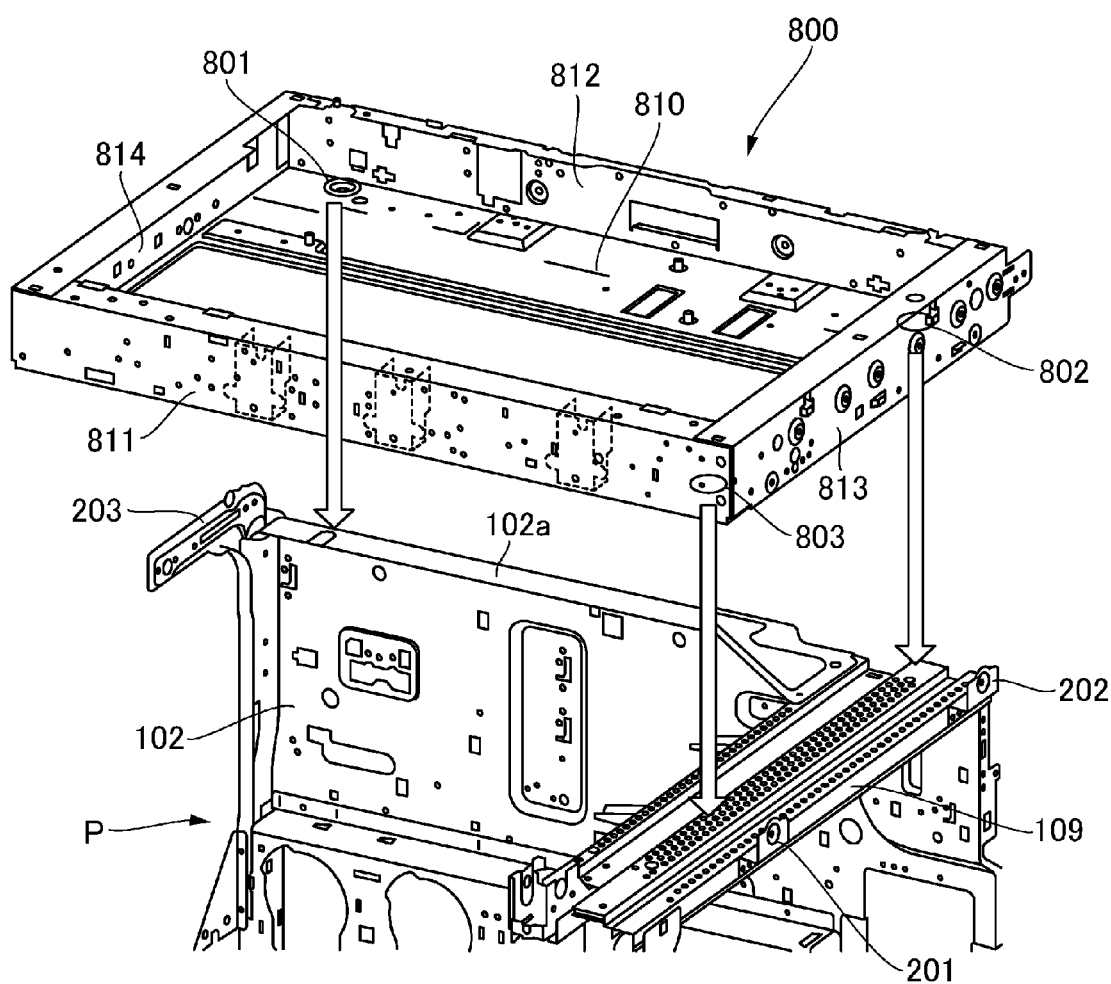
FIG. 3 is an enlarged exploded perspective view showing a portion where an image reading portion casing is supported by an image forming portion casing in the embodiment.

The supporting cantilever 203 is an open-side plate member which is supported at one end thereof by an upper left portion of the rear side plate 102 and which extends toward the front side at the other end thereof as shown in FIG. 3. Further, as shown in FIG. 3, fixing plate portions 201, 202 are fixed to the upper right stay 109 at a right-side surface of the upper right stay 109. Each of the fixing plate portions 201, 202 is formed by being bent so as to project upward from the lower right stay 109.

The thus-constituted image forming portion casing 100 is provided with the space P which continuously opens into two directions not only perpendicular to the up-down direction but also perpendicular to each other. As described above, in order to easily take out the recording material discharged on the discharge tray 21 disposed in the space P between the image reading device 400a and the image forming apparatus main assembly 300a, the space P continuously opens to the front surface and the left-side surface in the two directions. For this reason, a space where there is no portion supported by the image forming portion casing 100 is formed under the image reading portion casing 800 on a front left side. Here, the two directions toward the front surface and the left-side surface are two directions (front direction and left direction), distort each other, of four directions (front direction, rear direction, left direction and right direction) which hare not only distort the up-down direction of the image forming portion casing 100 but also perpendicular to each other.

In this embodiment, in order to realize such a constitution, an upper end position of the left post 105 is made lower than an upper end position of the right post 104. In other words, the upper end of the left post 105 is extended to a lower end of the above-described P and does not reach the image reading portion casing 800. On the other hand, the upper end of the right post 104 is extended to an upper end of the space P and reaches the neighborhood of a lower end of the image reading portion casing 800. Further, the front side plate 101 is disposed between the left post 105 and the right post 104 in a range from the upper end to an intermediary position of the left post 105, and the middle left stay 110 is disposed between an upper end position of the left post 105 and the rear side plate 102. As a result, the image forming portion casing 100 is provided with the space P which continuously opens into the two directions toward the front surface and the left-side surface. Incidentally, in FIG. 2, the space P of the image forming portion casing 100 also opens to the right-side surface, but between the right-side surface of the front surface of the space P, the right post 104 exists, and therefore two directions toward the right-side surface and the front surface are not continuous.

[Image Reading Portion Casing]

Figure 2:
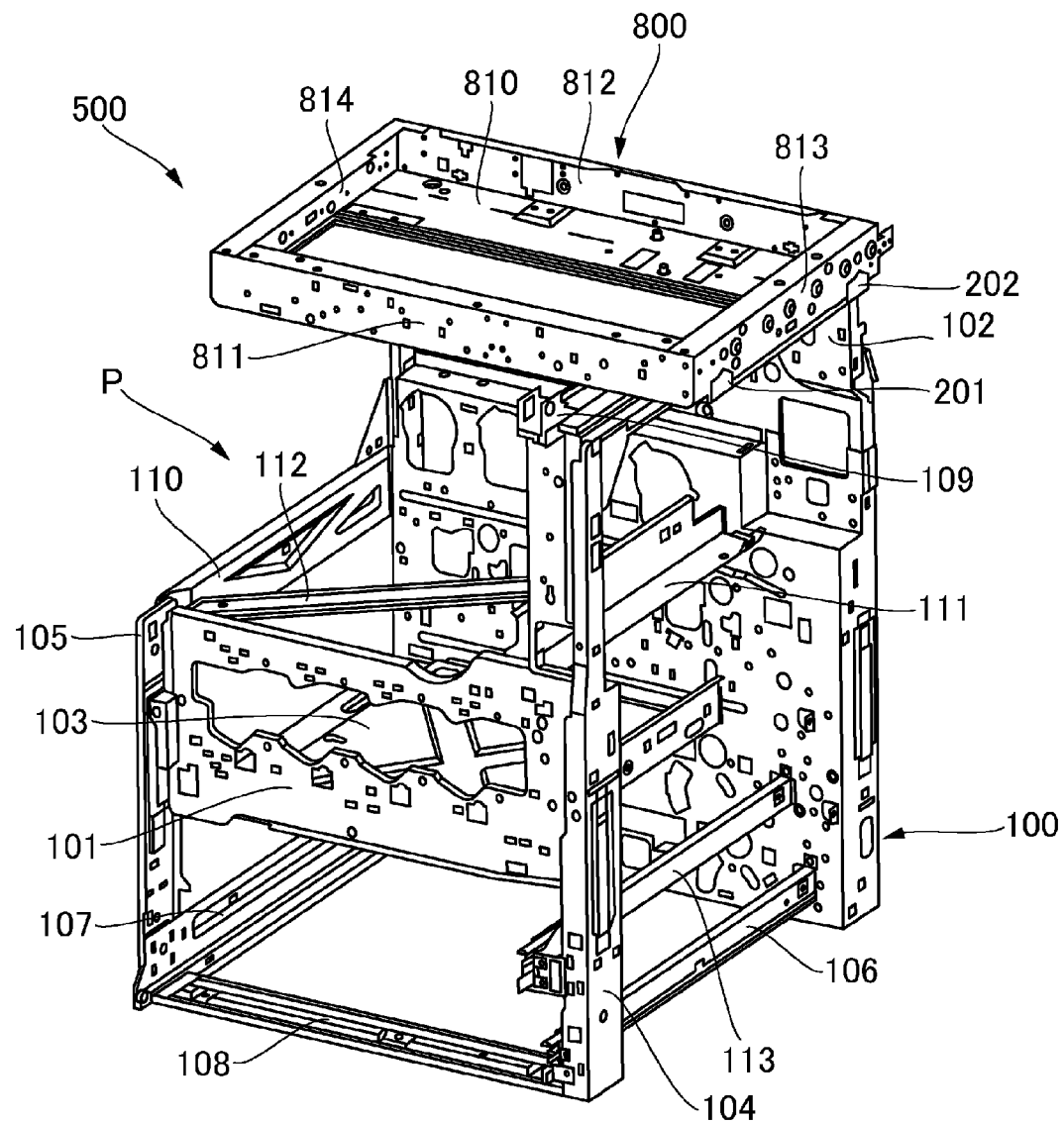
FIG. 2 is a perspective view of a structure for the image forming apparatus in the embodiment as seen from a front side.

The image reading portion casing 800 is, as shown in FIG. 2, formed in a substantially box-like shape and includes a bottom plate portion 810, a front wall portion 811, a rear wall portion 812, a right wall portion 813, a left wall portion 814, and the like. For this reason, the image reading portion casing 800 has a substantially rectangular shape when viewed from one of the up-down direction. The front wall portion 811, the rear wall portion 812, the right wall portion 813 and the left wall portion 814 wall portions formed so as to raise from a front side, a rear side, a right side and a left side, respectively, of the bottom plate portion 810 (in the up-down direction), and free ends thereof are bent toward the inside. The thus-constituted image reading portion casing 800 is disposed on the image forming portion casing 100 described below.

[Connection Between Image Reading Portion Casing and Image Forming Portion Casing]

Connection between the image reading portion casing 800 and the image forming portion casing 100 will be described using FIG. 3. FIG. 3 is a perspective view showing a separated state between the image forming portion casing 100 and the image reading portion casing 800. In this embodiment, the image forming portion casing 100 includes the upper right stay 109 and a bent plate portion 102a which are used as a mounting portion capable of mounting the image reading portion casing 800. The upper right stay 109 and the bent plate portion 102a re provided at positions where the above-described space P does not continuously open into the two directions, i.e., on the right-side and the rear surface, respectively.

That is, at an upper right portion of the image forming portion casing 100, the upper right stay 109 is disposed so as to connect the upper end of the right post 104 with the rear side plate 102, so that the image reading portion casing 800 is mountable on the upper surface of the upper right stay 109. Further, at an upper end portion of the rear side plate 102 and at a position which is substantially same height (level) as the upper surface of the upper right stay 109, the bent plate portion 102a bent from the upper end of the rear side plate 102 toward the front side is formed, so that the image reading portion casing 800 is mountable on the upper surface of the bent plate portion 102a. On the other hand, at the upper left portion of the image forming portion casing 100, as described above, the supporting cantilever 23 supported by the rear side plate 102 at one end thereof is disposed, but the image reading portion casing 800 is not mounted on the supporting cantilever 203. At a position which is substantially the same height as the upper right stay 109 of the image forming portion casing 100 and on the left side of the upper right stay 109, no member is disposed, and therefore at the portion, there is no portion on which the image reading portion casing 800 is mountable. Accordingly, the image reading portion casing 800 is mounted on the right side and the rear side where the space P does not open into the two directions.

As described above, the image reading portion casing 800 has the substantially rectangular shape as seen in one of the up-down direction, and the upper right stay 109 and the bent plate portion 102a as the mounting portion are positioned under mutually crossing two sides of the image reading portion casing 800. That is, the right side and the rear side of the substantially rectangular image reading portion casing 800 are mounted on the upper right stay 109 and the bent plate portion 102a, respectively. In the neighborhood of these two sides of the bottom plate portion 810 of the image reading portion casing 800, supporting portions 801, 802, 803 supporting the image reading portion casing 800 relative to the image forming portion casing 100 are provided. The supporting portions 801-803 support the image reading portion casing 800 relative to the image forming portion casing 100 irrespective of an external load on the image reading portion casing 800.

In the case of this embodiment, the three supporting portions 801-803 are provided, so that the image reading portion casing 800 is supported by the image forming portion casing 100 at three positions (three-point supporting). The supporting portions 801, 802, 803 for supporting the image reading portion casing 800 relative to the image forming portion casing 100 are formed so as to project downward at the three positions in the neighborhood of the above-described two sides of the bottom plate portion 810. That is, the supporting portion 801 is formed in the neighborhood of a corner between the side and the rear side of the bottom plate portion 810, the supporting portion 802 is formed in the neighborhood of a corner between the right side and the rear side of the bottom plate portion 810, and the supporting portion 803 is formed in the neighborhood of a corner between the right side and the front side of the bottom plate portion 810. Each of the supporting portions 801-803 is, as shown in (a) of FIG. 5, formed by being subjected to drawing so as to be projected downward at an associated position of the bottom plate portion 810. In (a) of FIG. 5, only the supporting portion 803 is shown, but the supporting portions 801, 802 are similarly formed.

In this embodiment, as described above, the supporting portions 801-803 are formed in the neighborhood of the two sides connecting the three corners, other than a front left corner, of the substantially rectangular image reading portion casing 800, i.e., in the neighborhood of the right side and the rear side of the image reading portion casing 800. Further, the supporting portions 801-803 are discharged in the neighborhood of the above-described three corners, i.e., those other than the front left corner. When the image reading portion casing 800 is mounted on the image forming portion casing 100, the supporting portions 801-803 contacts the upper surfaces of the upper right stay 109 and the bent plate portion 102a, whereby the image reading portion casing 800 is supported by the image forming portion casing 100. Specifically, the supporting portion 801 contacts the upper surface of the bent plate portion 102a, and the supporting portions 802, 803 contact the upper surface of the upper right stay 109. As a result, the image reading portion casing 800 is positioned with respect to the up-down direction.

As described above, in the state in which the image reading portion casing 800 is mounted on the image forming portion casing 100, the image reading portion casing 800 is fixed on the image forming portion casing 100. Specifically, in the state in which the image reading portion casing 800 is mounted on the image forming portion casing 100, the image reading portion casing 800 is sandwiched between the fixing plate portions 201, 202 fixed on the upper right stay 109 and the supporting cantilever 203 supported on the rear side plate 102 at the upper left portion in an open-side state. Then, the image reading portion casing 800 is fastened to the fixing plate portions 201, 202 with screw or the like on the right side and is fastened to the supporting cantilever with screws or the like on the left side. As a result, not only the image reading portion casing 800 is positioned with respect to a direction perpendicular to the up-down direction but also the image reading portion casing 800 is fixed on the image forming portion casing 100.

In this way, the image reading portion casing 800 is supported at the three positions of the upper surfaces (installation surface) of the upper right stay 109 and the bent plate portion 102a, so that not only the image reading portion casing 800 can be stably supported but also distortion can be suppressed. Further, in this embodiment, as described later, the upper right stay 109 and an auxiliary supporting portion 109a are provided in a state in which a predetermined gap (spacing) with the image reading portion casing 800 is formed in a state in which the image reading portion casing 800 is mounted on the image forming portion casing 100.

Comparison Example

Figure 4:
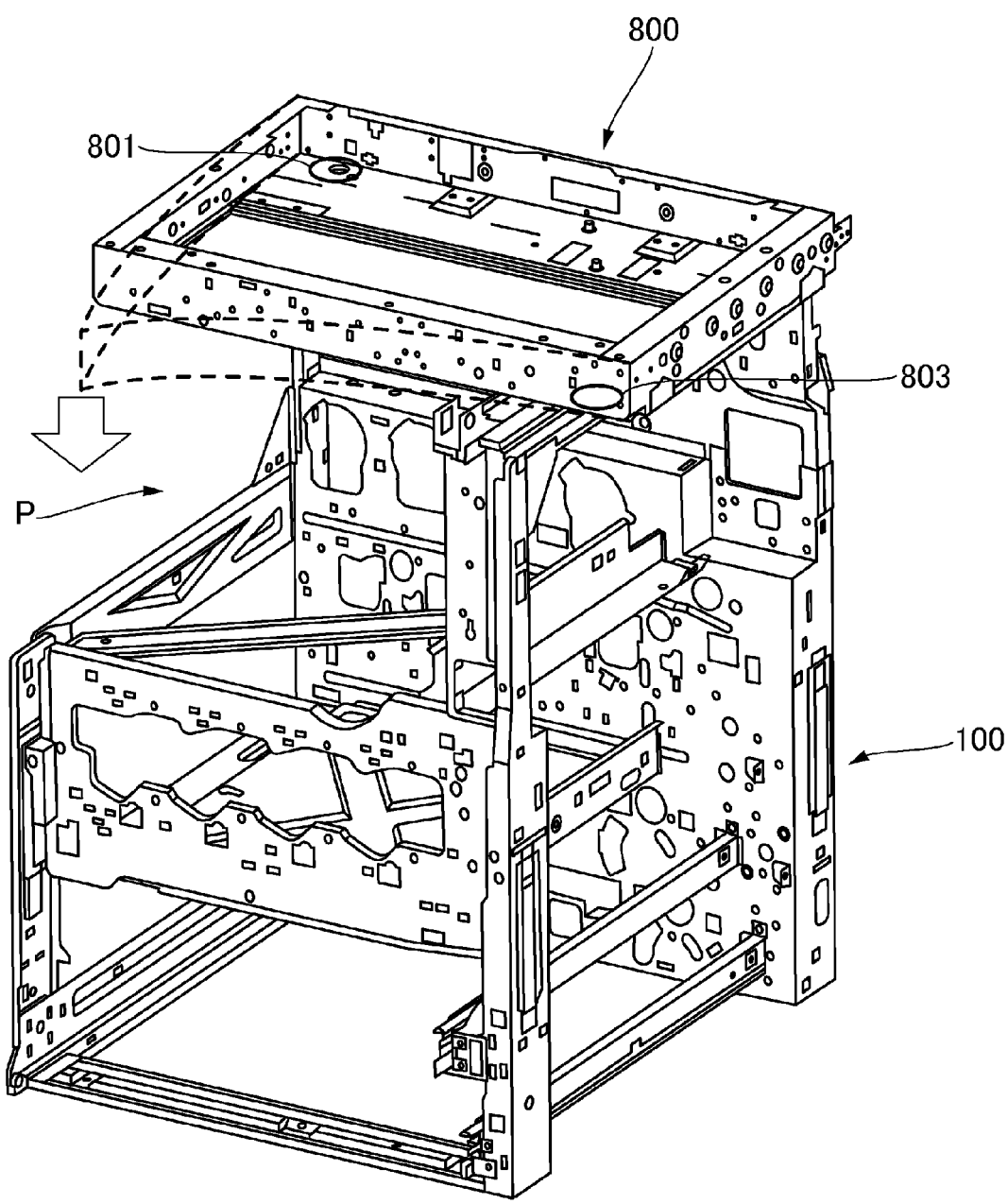
FIG. 4 is a schematic view showing a state in which a load is exerted on an image reading portion casing in an exaggerated manner in Comparison Example.

Comparison Example in which the auxiliary supporting portion 109a is not provided in the above-described constitution will be described using FIG. 4. In the case of Comparison Example, when a load is externally exerted an upper portion of the image reading portion casing 800 downward at a position deviated (away) from the portion where the image reading portion casing 800 is mounted on the image forming portion casing 100, as indicated by a broken line in an exaggerated manner, there is a possibility that the image reading portion casing 800 is distorted. For example, there is a possibility that the load is exerted as described above during transportation of the image forming apparatus or when a user leans against the image reading device. Particularly, at an upper portion of the portion of the image reading portion casing 800 where the space P continuously opens into the two directions, i.e., at the front left corner of the image reading portion casing 800, in the case where the load is exerted on the portion downward, a force of twisting the image reading portion casing 800 so that the front left portion of the image reading portion casing 800 lowers generates. By this twisting, there is a possibility that the image reading portion casing 800 is plastically deformed to cause distortion.

[Auxiliary Supporting Portion]

Figure 5:
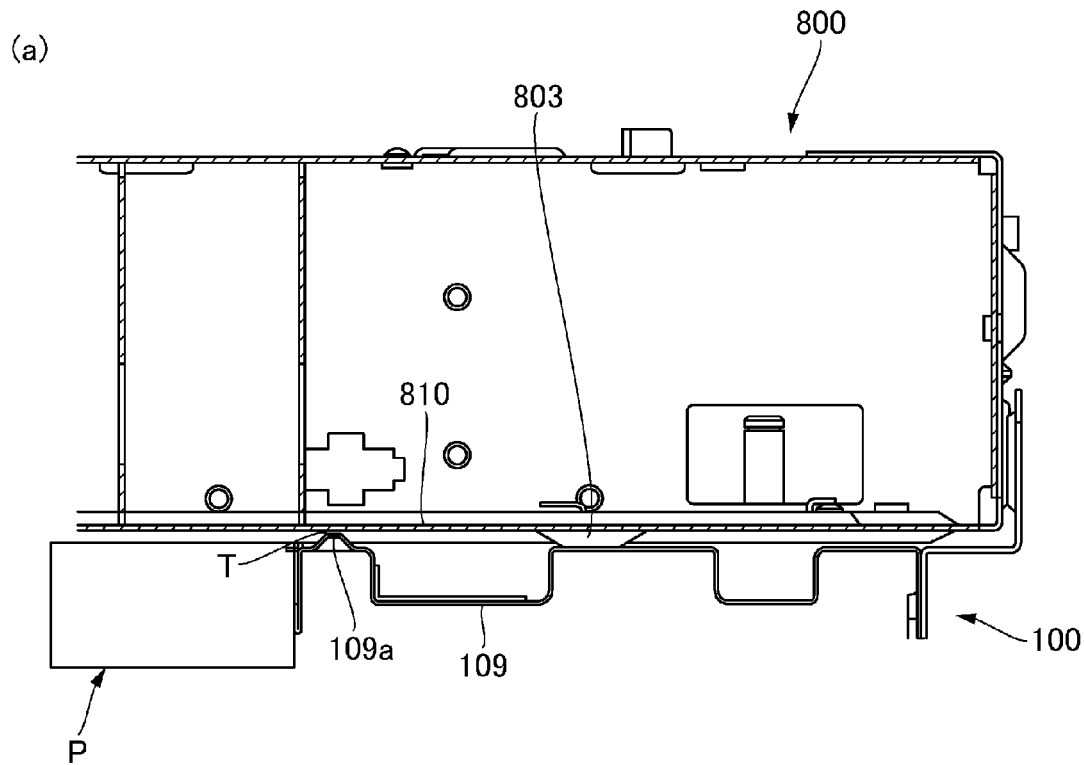
In FIG. 5, (a) is a sectional view of a portion where the image reading portion casing is supported by the image forming portion casing in the embodiment, in which the portion is cut along a left-right direction and is viewed from a front side in the neighborhood of an auxiliary supporting portion on a front right side, and (b) is an enlarged sectional view of the auxiliary supporting portion.
Figure 5:
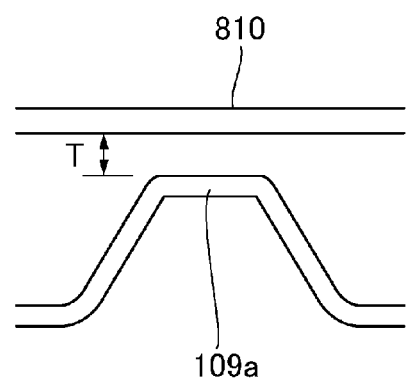
Figure 6:
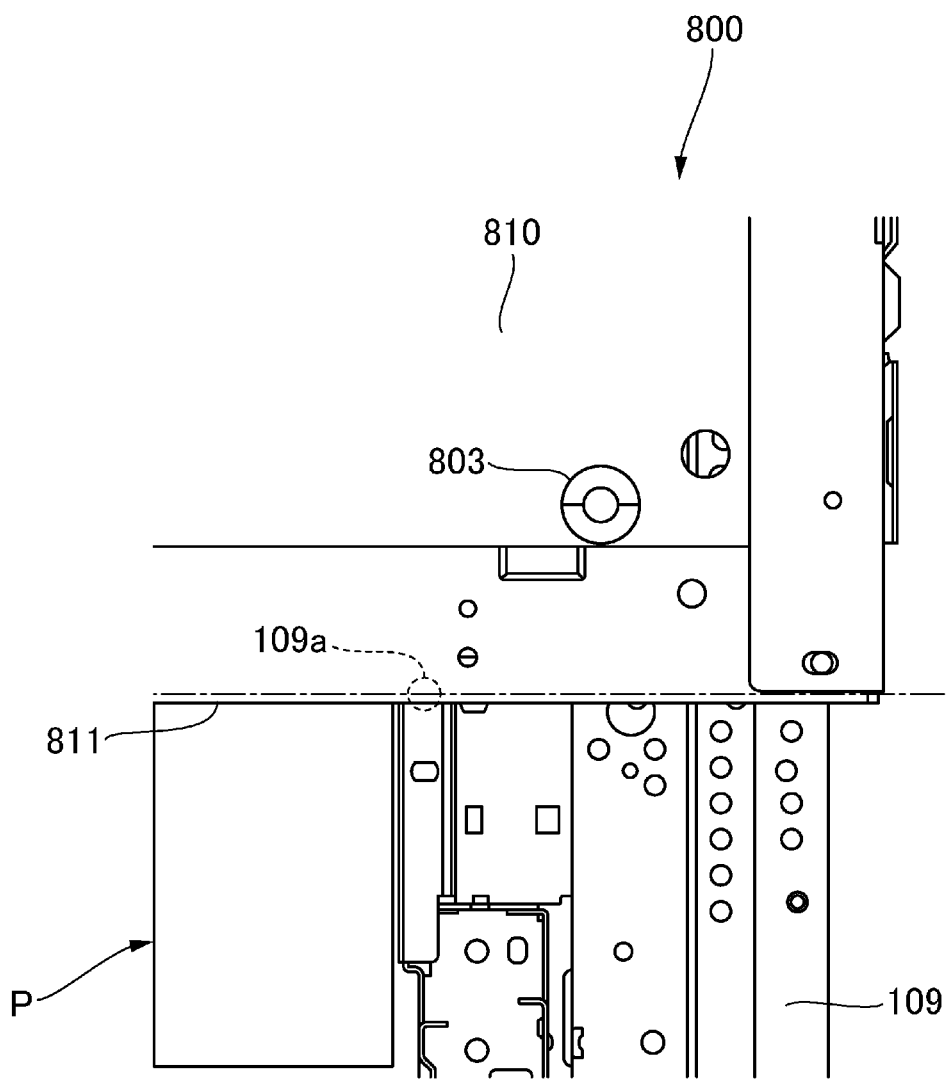
FIG. 6 is a schematic view of the portion where the image reading portion casing is supported by the image forming portion casing in the embodiment, in which the neighborhood of the portion on the front right side is viewed from above.

Therefore, in this embodiment, as shown in FIGS. 5 and 6, by providing the auxiliary supporting portion 109a, the above-described distortion is suppressed. The auxiliary supporting portion 109a is provided on the upper surface of the upper right stay 109 as the mounting portion and forms a gap (spacing) with a part of the image reading portion casing 800 in a state in which the load is not externally exerted on the image reading portion casing 800. On the other hand, the auxiliary supporting portion 109a contacts the part of the image reading portion casing 800 in the case where a load not less than a predetermined load is externally exerted on the upper portion of the image reading portion casing 800 downward at the position deviated from the upper right stay 109 and the bent plate portion 102a. Thus, the image reading portion casing 800 is supported by the image forming portion casing 100.

Specifically, the auxiliary supporting portion 109a is, as shown in (a) of FIG. 5, provided on a side toward the space P move than the supporting portion 803 in a state in which a predetermined gap T is formed between itself and the bottom plate portion 810 of the image reading portion casing 800. The auxiliary supporting portion 109a is formed by being subjected to drawing so as to project upward at a part of the upper right stay 109, toward the space P, which is formed by subjecting a metal plate to bending. In addition, as shown in (b) of FIG. 5, the predetermined T is formed between a top of the auxiliary supporting portion 109a and the lower surface of the bottom plate portion 810.

The predetermined gap T is set so as to be smaller than a deformation amount in which the image reading portion casing 800 is plastically deformed in the case where the auxiliary supporting portion 109a is not provided when the predetermined load is externally exerted on the front left corner of the image reading portion casing 800 downward. Here, the front left corner of the image reading portion casing corresponds to the upper portion of the portion where the space P continuously opens into the two directions. The predetermined load is appropriately set depending on a structure of the image reading portion casing 800 or a relationship between a position of the auxiliary supporting portion 109a and positions of the supporting portions 801-803, but is 49N (about 5 kgf) or more in this embodiment. An upper limit of the predetermined load also depends on strength of the auxiliary supporting portion 109a and can be appropriately set, but is 400N (about 40 kgf or about 41 kgf) in this embodiment. That is, in this embodiment, the predetermined load is 49N or more and 400N or less.

Also the predetermined gap T is appropriately set depending on the structure of the image reading portion casing 800 or the relationship between the position of the auxiliary supporting portion 109a and the positions of the supporting portions 801-803 so as to satisfy the above-described condition. In either case, the auxiliary supporting portion 109a forms the predetermined gap T with the lower surface of the bottom plate portion 810 in the state in which the load is not externally exerted on the image reading portion casing 800. In the case where the load of 49N or more is externally exerted on the front left corner of the image reading portion casing 800, the auxiliary supporting portion 109a contacts the lower surface of the bottom plate portion 810, so that the image reading portion casing 800 is supported by the image forming portion casing 100 to be prevented from being plastically deformed.

The position where the auxiliary supporting portion 109a is provided is on the space P side more than any one of the supporting portions 801-803. This is because in the case where the downward load is exerted on the upper side of the space P of the image reading portion casing 800, the image reading portion casing 800 on the space P side is likely to deform with the supporting portions 801-803 as a fulcrum so as to lower. For this reason, such deformation can be suppressed efficiently by providing the auxiliary supporting portion 109a on the space P side more than any one of the supporting portions 801-803. Particularly, the position where the auxiliary supporting portion 109a is provided may preferably be disposed in the neighborhood of the supporting portions 801, 803 disposed close to the front left corner. In this embodiment, on the rear left side where the supporting portion 801 is provided, the image reading portion casing is fixed on the supporting cantilever 203, and therefore at this portion, the deformation of the image reading portion casing 800 is suppressed by the supporting cantilever 203. Accordingly, the auxiliary supporting portion 109a is provided not only in the neighborhood of the front right-side supporting portion 803 but also on the space P side more than this supporting portion 803. Incidentally, a similar auxiliary supporting portion may also be provided on the supporting portion 802 side.

Further, the auxiliary supporting portion 109a is provided below the front wall portion 811 as the wall portion formed along the up-down direction of the image reading portion casing 800 as shown in FIG. 6. As a result, in the case where the load as described above is exerted on the image reading portion casing 800, the auxiliary supporting portion 109a contacts a lower portion or the neighborhood of the front wall portion 811 of the bottom plate portion 810. The front wall portion 811 is formed along the up-down direction, and therefore the rigidity against the up-down direction is high. For this reason, the auxiliary supporting portion 109a is provided at this position, so that distortion of the image reading portion casing 800 in the case where the load is exerted on the image reading portion casing 800 can be efficiently suppressed.

As described above, in this embodiment, even in such a constitution that the space P between the image reading portion casing 800 and the image forming portion casing 100 continuously opens into the two directions, the distortion of the image reading portion casing 800 can be caused to less generate. That is, in the case of this embodiment, in addition to the supporting portions 801-803 supporting the image reading portion casing 800 relative to the image forming portion casing 100, the auxiliary supporting portion 109a is provided via the predetermined gap T between itself and the image reading portion casing 800. For this reason, in the case where the load of not less than the load predetermined is externally exerted on the image reading portion casing 800, the image reading portion casing 800 contacts the auxiliary supporting portion 109a, so that the distortion of the image reading portion casing 800 can be caused to less generate. As a result, it is possible to suppress a phenomenon that the image reading portion casing 800 causes the distortion to lower accuracy of image reading by the image reading portion casing 800. Further, the distortion of the image reading portion casing 800 can be suppressed without increasing the thickness of the supporting cantilever 203 or without separately providing the reinforcing member, and therefore it is possible to suppress increases in weight and manufacturing cost.

Further, in the case of this embodiment, the image reading portion casing 800 and the auxiliary supporting portion 109a are in non-contact with each other in the state in which the load is not exerted on the image reading portion casing 800 or in the case where the load less than the predetermined load is exerted on the image reading portion casing 800. For this reason, in such a normal state, the image reading portion casing 800 is supported at three positions by the image forming portion casing 100. For example, in the case where the image reading portion casing 800 is supported at four positions, there is a possibility that one or more supporting portion which does not contact the mounting surface exists due to tolerance of each of members, e.g., a difference in projection amount between the respective supporting portions or parallelism of the mounting surface for the upper right stay 109 and the bent plate portion 102a. In this case, there is a possibility that the image reading portion casing 800 causes twisting. On the other hand, in this embodiment, the auxiliary supporting portion 109a contacts the image reading portion casing 800 in the case where the load not less than the predetermined load is exerted on the image reading portion casing 800, and therefore in the above-described normal state, the image reading portion casing 800 is prevented from being supported at the four positions. As a result, in the normal state, the image reading portion casing 800 is stably supported by the image forming portion casing 100, so that generation of the twisting can be suppressed.

Other Embodiments

In the above-described embodiment, the three supporting portions for supporting the image reading portion casing 800 relative to the image forming portion casing 100 are provided (three-point supporting), but the supporting portion may only be required to be provided at one position. However, in the case where the image reading portion casing 800 is intended to be supported at the four or more positions, there is a possibility of existence of the supporting portion which does not contact the mounting surface due to the tolerance of each of the members. In this case, the image reading portion casing 800 causes the twisting. For this reason, the image reading portion casing 800 may preferably be supported at less position to the possible extent. On the other hand, when the single supporting portion for supporting the image reading portion casing 800 is provided, the image reading portion casing 800 becomes unstable. For this reason, the number of the supporting portions for supporting the image reading portion casing 800 may preferably be two or three, more preferably be three.

The above-described supporting portion includes not only the case where the contact portion such as a projection contacting the mounting surface is one at one position but also the case where the contact portion is two at one position. For example, a single supporting portion is constituted by disposing two contact portions with a small interval. Here, in a constitution including three supporting portions, when any one of the supporting portions has two contact portions with a large interval, the constitution is not changed from a 4-point-supporting constitution in the end. For this reason, in this case, the interval between the two contact portions is made small, e.g., made ⅓ or less of a length one side in the neighborhood of the bottom plate portion 810 where the supporting portions are provided.

In the above-described embodiment, the supporting portions are provided on the image reading portion casing 800, but may also be provided on the image forming portion casing 100 or on both of the image reading portion casing 800 and the image forming portion casing 100. For example, the supporting portion 801 is post on the image reading portion casing 800 side, and the supporting portions 802, 803 are disposed or the image forming portion casing 100 side. In summary, the supporting portion may only be required to be disposed at least at any position of the mounting portion between the image reading portion casing 800 and the image forming portion casing 100.

Further, in the above-described embodiment, the single auxiliary supporting portion is provided on the upper surface of the upper right stay 109 as the mounting portion of the image forming portion casing 100, but may also be provided on the image reading portion casing 800. A plurality of auxiliary supporting portions may also be provided on either one or both of the image reading portion casing 800 and the image forming portion casing 100. For example, one auxiliary supporting portion is provided on the image reading portion casing 800 side in the neighborhood of the supporting portion 801 and another auxiliary supporting portion is provided on the image forming portion casing 100 side in the neighborhood of the supporting portion 803. In either case, in the case where the auxiliary supporting portion is provided on one of the image reading portion casing 800 and the image forming portion casing 100 at the mounting portion, a gap is provided at the mounting portion in a state in which the load not less than the predetermined load is not exerted on the image reading portion casing 800.

According to the present invention, even in such a constitution that the space between the image reading portion casing and the image forming portion casing continuously opens into the two directions, the distortion of the image reading portion casing can be caused to less generate while suppressing the increases in weight and manufacturing cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-007944 filed on Jan. 19, 2015, which is hereby incorporated by reference herein in its entirety.

What is claimed is:

1. An image forming apparatus comprising:
a first casing configured to accommodate a reading portion for reading an image to be read;
a second casing configured to accommodate an image forming portion for forming an image to be formed, wherein said second casing is provided below said first casing with respect to a vertical direction and includes a mounting portion, on which said first casing is mountable, at an upper portion of said second casing, said mounting portion including a first mounting portion provided at a first-side-surface side of said second casing and a second mounting portion provided at a second-side-surface side perpendicular to the first-side-surface side of said second casing;
wherein between said first casing and said second casing, a space, for permitting discharge of a recording material on which the image to be formed is formed by the image forming portion, is provided so as to continuously open toward a third-side-surface side opposing the first-side-surface side and a fourth-side-surface side opposing the second-side-surface side;
a first supporting portion configured to support said first casing, wherein said first supporting portion is provided on at least one of said first casing and said mounting portion at a position away from said second mounting portion with respect to a widthwise direction of the first-side-surface side of said first mounting portion;
a second supporting portion configured to support said first casing, wherein said second supporting portion is provided on at least one of said first casing and said mounting portion at a position at a second mounting portion side with respect to the widthwise direction of the first-side-surface side of said first mounting portion;
a third supporting portion configured to support said first casing, wherein said third supporting portion is provided on at least one of said first casing and said mounting portion at a position away from said first mounting portion with respect to a widthwise direction of the second-side-surface side of said second mounting portion;
a projection provided on one of an upper surface of said first mounting portion and a bottom of said first casing and having a surface facing the one of the upper surface of said first mounting portion and the bottom of said first casing on which said projection is not provided, wherein said projection is disposed between the upper surface of said first mounting portion and the bottom of said first casing, with a predetermined gap between the surface of said projection and the one of the upper surface of said first mounting portion and the bottom of said first casing on which said projection is not provided, in a state in which no load is externally exerted on said first casing, and wherein said projection regulates an attitude of said first casing in a state in which a predetermined load is exerted downward on an upper portion of a corner formed between the third-side-surface side and the fourth-side-surface side of said first casing; and
a cantilever provided on the second-side-surface side of said second casing on an opposite side to said first mounting portion with respect to the widthwise direction of the second-side-surface, wherein said cantilever is configured so that the bottom of said first casing is not mounted on said cantilever, and said cantilever includes a fixing portion configured to fix a side surface of said first casing and said second casing.

2. An image forming apparatus according to claim 1, wherein said predetermined load is at least 49 N.

3. An image forming apparatus according to claim 2, wherein a free end of said projection is formed having a flat surface shape so as to follow a surface of one of the upper surface of said first mounting portion and the bottom of said first casing opposing said projection, opposing said projection.

4. An image forming apparatus according to claim 2, wherein said projection is provided on said second casing, and is disposed on an opposite side to said second supporting portion relative to said third supporting portion with respect to the widthwise direction of the second-side-surface.

5. An image forming apparatus according to claim 2, further comprising a wall portion formed on said first casing in the vertical direction, wherein said projection is disposed below said wall portion with respect to the vertical direction.

6. An image forming apparatus according to claim 2, wherein said projection is disposed on an opposite side to said fixing portion with respect to the widthwise direction of the first-side-surface and is disposed closer to said third supporting portion than to said second supporting portion with respect to the widthwise direction of the second-side-surface.

7. An image forming apparatus according to claim 2, wherein said projection is formed of metal by subjecting the metal to drawing.

8. An image forming apparatus according to claim 2, wherein said projection is formed of metal.

* * * * *